T. B. WYLIE.
APPARATUS FOR MEASURING GAS AND OTHER FLUIDS.
APPLICATION FILED AUG. 27, 1914.

1,308,569.

Patented July 1, 1919.
2 SHEETS—SHEET 1.

WITNESSES
R A Balderson
Jesse B. Heller.

INVENTOR
Thos. B. Wylie
by Bakewell, Byrnes Parmelee
attys.

T. B. WYLIE.
APPARATUS FOR MEASURING GAS AND OTHER FLUIDS.
APPLICATION FILED AUG. 27, 1914.
1,308,569.
Patented July 1, 1919.
2 SHEETS—SHEET 2.
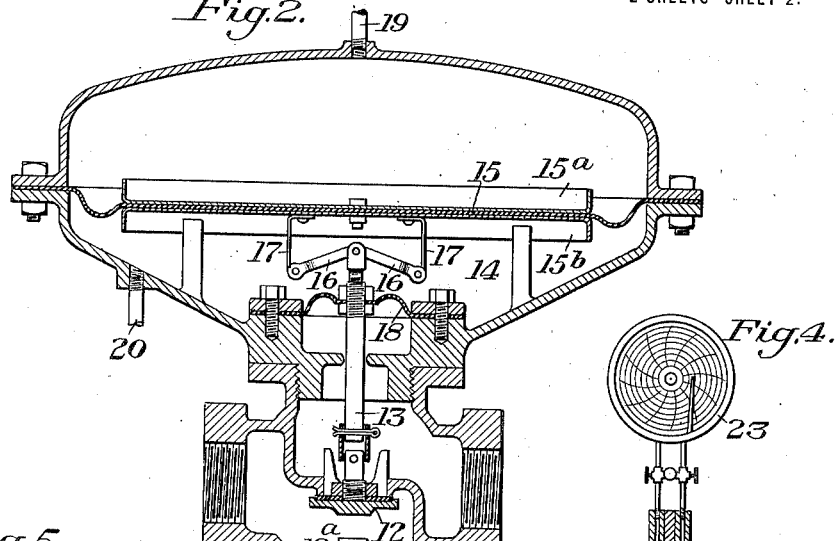
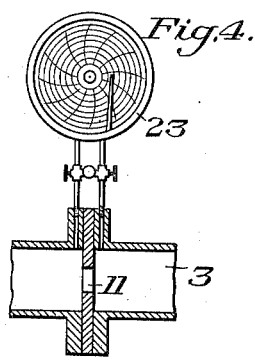
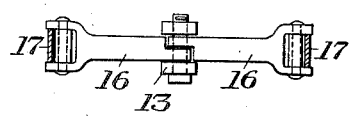
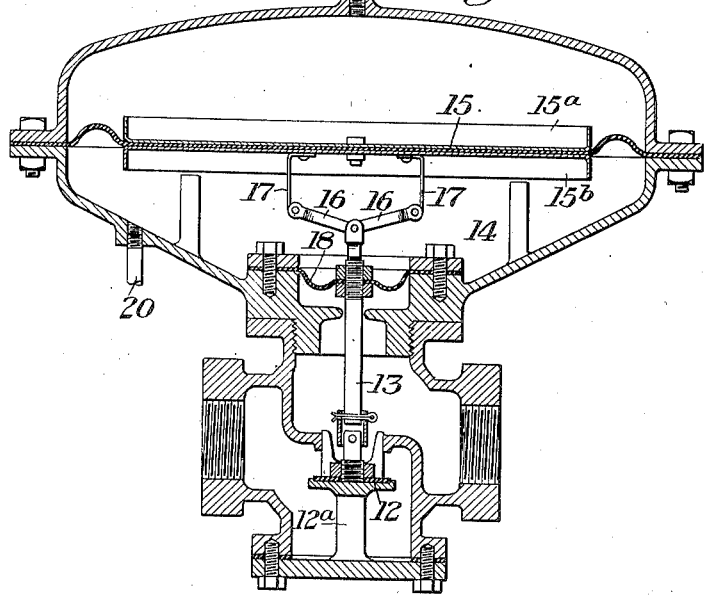
WITNESSES
R. A. Balderson
Jesse B. Heller
INVENTOR
Thos. B. Wylie
by Bakewell, Byrnes & Parmelee
Attys.

UNITED STATES PATENT OFFICE.

THOMAS B. WYLIE, OF PITTSBURGH, PENNSYLVANIA.

APPARATUS FOR MEASURING GAS AND OTHER FLUIDS.

1,308,569. Specification of Letters Patent. Patented July 1, 1919.

Application filed August 27, 1914. Serial No. 858,877.

*To all whom it may concern:*

Be it known that I, THOMAS B. WYLIE, a citizen of the United States, residing at Pittsburgh, in the county of Allegheny and State of Pennsylvania, have invented a new and useful Improvement in Apparatus for Measuring Gas and other Fluids, of which the following is a full, clear, and exact description, reference being had to the accompanying drawings, forming part of this specification, in which:

Figs. 2 and 3 are sectional views illustrating one form of the automatic valves, Fig. 2 showing the valve closed, and Fig. 3 showing it open.

Fig. 4 is a detail sectional view showing one of the throttle plates and one of the differential meters, and Fig. 5 is a detail view showing a part of the valve actuating connections.

Figure 1:
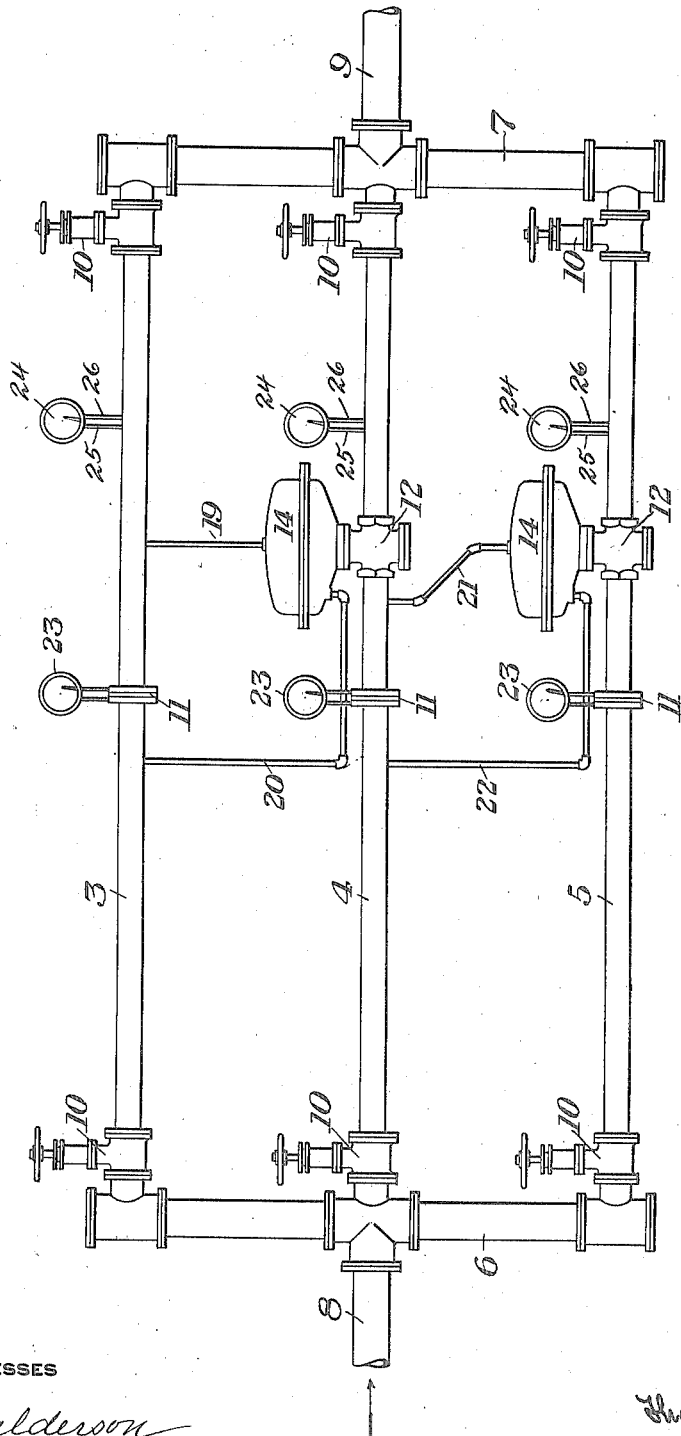
Figure 1 is a view, largely diagrammatic, of one form of apparatus embodying my invention, and by which my method can be carried out.

My invention has relation to a method and apparatus for more accurately measuring by means of differential gages, gas or other fluid passing from a main to a service pipe, irrespective of great variation in the flow of gas through the service pipe.

The measuring of gas by this system by means of a differential gage and an orifice plate or throttle device, is well known to the art. The great difficulty with systems of this character has been to accurately register the gas passing the throttle device if the flow of the gas was greatly increased or decreased through the service pipe, as it is well known that great fluctuations will take place on opposite sides of the throttle device under such conditions.

One of the objects of my invention is to provide a system of control whereby the differences in pressure on opposite sides of the throttling devices will not vary beyond predetermined limits. I accomplish this by connecting the service pipe to the main by means of a plurality of delivery pipes, which are connected in multiple to the service and the delivery pipes, and in which each of the delivery pipes is provided with a differential gage and a throttle device. The delivery pipes are arranged so that gas is caused to flow through one or more of the pipes in accordance with the demand for gas.

Another object of my invention is to provide automatic valves for successively throwing into and out of service the delivery pipes in accordance with the demand.

Still another object of my invention is to provide an automatic valve which will be instantaneously shifted from full open position to its closed position, or from its closed position to its full open position.

The precise nature of my invention will be best understood by reference to the accompanying drawings, in which I have shown one embodiment thereof and which will now be described, it being premised however, that various changes can be made in the details of construction and arrangement of the parts, without departing from the spirit and scope of my invention, as defined in the appended claims.

In accordance with my invention, I provide any desired number of delivery passages or pipes, such as shown at 3, 4 and 5 in Fig. 1. These pipes are all connected at one end by a pipe or header 6 and at the opposite end by another pipe or header 7. The supply side of the system is connected to one of the headers, as indicated at 8, and the delivery or service side to the other header, as indicated at 9. The pipes 3, 4 and 5 may be provided with hand valves 10 which can be used in case of emergency or while repairs are being made, to positively cut off the flow of gas from the main to the service pipe, through any one or all of the pipes 3, 4 and 5. The pipes 3, 4 and 5 are each provided at some suitable point with a throttling device, such as an orifice plate 11 (shown in detail in Fig. 4). The flow of gas through the pipe 3 with the valve 10 open is at all times unobstructed except for the throttling device. Each of the pipes 4 and 5, however, is provided with a control valve 12, normally closed when the minimum flow of gas is passing from the main to the service pipe. If, however, the demand for gas required is above a predetermined limit, the valve 12 in the pipe 4 will be automatically opened with the increased flow of gas from the main to the service pipe, and if the demand is still further increased, the valve 12 in the pipe 5 will automatically open with the further increase. If the demand is gradually cut down, the valve 12 in the pipe 5 will be first closed and if the demand further decreases, the valve 12 in the pipe 4 will then automatically be closed, as hereinafter described.

The valves 12 may be operated automatically in various ways, controlled by the difference in pressure at opposite sides of the throttling devices or orifice plates.

In the construction illustrated, each valve 12 is connected to a rod or stem 13 which extends upwardly into a diaphragm chamber 14 having a transverse diaphragm 15, which divides the diaphragm chamber into two compartments. Connected to the diaphragm 15 on opposite sides thereof are plates $15^a$ and $15^b$. Each rod or stem is connected to the bottom plate of its diaphragm by means of the oppositely extending link arms 16, connected at their inner ends to said rod and at their outer ends to leaf springs 17, which are rigidly attached to the bottom plate of the diaphragm. Each stem is also preferably connected to and passes through a smaller diaphragm 18, which is subjected to substantially the same pressure as the valve and prevents the pressure from the valve chamber acting directly on the bottom of the diaphragm 15. One side of the diaphragm chamber 14, which controls the valve 12 of the pipe 4 is connected by a pipe 19 with the pipe 3 at the low pressure side of the throttling device; and the other side of said diaphragm chamber is connected, as by a pipe 20, with the pipe 3 at the high pressure side of the throttling device in said pipe. The two sides of the diaphragm chamber which control the valve 12 for the pipe 5 are connected by pipes 21 and 22 with opposite sides of the throttling device in pipe 4.

I have also shown connected to each of the pipes 3, 4 and 5, a differential gage 23, each of which is connected to the opposite sides of its throttling device in the usual manner to record the differential pressure on opposite sides of the throttling device. I have also shown a static recorder 24 connected to each of the pipes 3, 4 and 5 beyond the throttling devices by means of a tube 25 and a support 26, and which is arranged to record the pressure in each of the delivery pipes.

The operation of the device is as follows: Assuming that the valves 12 in pipes 4 and 5 are closed and the minimum amount of gas is being used, which passes through the pipe 3 and the throttling device therein, the amount of gas is recorded on the differential gage 23 connected thereto. As soon as the demand increases beyond a predetermined point, so that the difference of pressures on opposite sides of the throttling device 11 in the pipe 3 passes a predetermined limit, the pressure in the lower portion of the diaphragm chamber 14 for the valve 12 in the pipe 4, will be increased sufficiently to move the diaphragm upwardly. During the upward movement of the diaphragm the outer ends of the link arms 16 will be moved upwardly extending the springs 17 until the outer ends of these arms pass a horizontal line through the pivotal connections of both arms, and as soon as this point is reached the inward pressure of the spring arms will force the valve 12 downwardly from its seat upon a stop $12^a$ in the valve casing, thereby allowing gas to flow through pipe 4. As soon as a further supply of gas is demanded and the differential pressure on opposite sides of the throttling device 11 in pipe 4 exceeds a predetermined limit, the valve 12 in pipe 5 will be automatically opened to deliver gas through the pipe 5, together with pipes 3 and 4.

In the drawings, I have merely shown three delivery pipes, but it will readily be understood by those familiar with the art that the number of pipes or passages may be varied in accordance with the maximum and minimum amount of gas required by the individual plant in which the system is installed.

Assuming that gas is flowing through the passages 3, 4 and 5 and the demand for gas is decreased so that the differential pressure on opposite sides of the throttling device will pass the other extreme limit, pressure will be built up in the upper portion of the valve chamber 14 controlling the valves 12 which will tend to reverse the positions of the diaphragms to move them from the position shown in Fig. 3 to that shown in Fig. 2. In order to close the valves in proper sequence, the weights on the diaphragms or the spring arms 17 for controlling the different valves are arranged so that the valves will close in the reverse order from which they were opened, so that the first valve to close will be the valve controlling the pipe 5, and if the demand for gas is further decreased the valve 12 in pipe 4 will be closed so that gas will only pass from the main to the service pipe through the pipe or passage 3.

The advantages of my invention result from the provision of a method for measuring gas, which is arranged to automatically increase or decrease the number of passages from the mains to the delivery or service pipes, in accordance with the demand for gas at the service end, whereby the flow of gas through each of the delivery pipes is maintained within predetermined limits. Further, from the provision of means for instantaneously fully opening the different delivery passages in a predetermined order, as well as closing said passages in a prearranged order, to permit the full flow of gases to pass through the passages or to entirely cut off the flow.

I claim:

1. A gas metering device of the character described, comprising a plurality of meters connected in multiple between a supply main and a service main, control valves for some of the meters controlled by the differential pressure on opposite sides of the meters and acting automatically to successively cut in or cut out the meters as the flow of gas increases or decreases, substantially as described.

2. A gas metering device of the character described, comprising a plurality of meters and actuated by the differential pressure between opposite sides of the meters and connected in multiple between a supply main and a service main, and control valves for some of the meters controlled by the differential pressure on opposite sides of the meters and acting automatically to successively cut in or cut out the meters as the flow of gas increases or decreases, substantially as described.

3. A gas metering device of the character described, comprising a meter connected between a supply main and a service main, another meter connected in multiple with the first meter, and a control valve for the second meter controlled by the differential pressure on opposite sides of the first meter and acting automatically to go from fully closed to fully open position when the flow of gas exceeds a predetermined maximum and to go from fully open to fully closed position when the flow falls below a predetermined minimum; substantially as described.

4. A gas metering device of the character described, comprising a meter connected between a supply main and a service main, another meter connected in multiple with the first meter, and a control valve for the second meter controlled by the differential pressure between the supply and service mains and acting automatically to fully open when the differential pressure exceeds a predetermined maximum and to remain fully open until the pressure falls below a predetermined minimum substantially lower than the maximum and to fully close when the pressure falls below said minimum and remain fully closed until the pressure again exceeds the said maximum, said minimum pressure being less than the pressure to which the gas will drop when the control valve for the second meter is opened, whereby fluttering of the valve is prevented; substantially as described.

5. A gas metering device of the character described, comprising a meter connected between a supply main and service main and having a restricted orifice and actuated by the differential pressure between opposite sides of the orifice, another meter connected in multiple with the first meter and having a restricted orifice and actuated by the differential pressure between opposite sides of the orifice, and a control valve for a second meter actuated by the differential pressure between the inlet and outlet sides of the orifices, said valve acting automatically to fully open when said pressure exceeds a predetermined maximum and remain fully open until the pressure falls below a predetermined minimum substantially less than the maximum, and to fully close when the pressure falls below said predetermined minimum and remain fully closed until the pressure again exceeds the said maximum, said minimum pressure being less than that to which the differential pressure of the gas at opposite sides of said orifices will drop when the control valve is opened, whereby fluttering of the valve is prevented, substantially as described.

6. A gas metering device of the character described, comprising a meter connected between a supply main and a service main, a plurality of other meters connected between the supply and service main in multiple with the first meter, control valves for the last mentioned meters, and means acting automatically to open said valves successively as the flow of gas increases and to close the valves successively in an order inverse to that of their opening as the flow of gas decreases; substantially as described.

7. A gas metering device of the character described, comprising a meter connected between the supply main and a service main, a plurality of other meters connected in multiple with the first meter, control valves for the last mentioned meters, and means acting automatically to move the valves from fully closed to fully open positions successively as the flow of gas increases above successive and predetermined maxima and to successively move the valves from fully open to fully closed positions as the flow of gas decreases below certain corresponding successive and predetermined minima; substantially as described.

8. A gas metering device of the character described, comprising a meter connected between a supply main and a service main, a plurality of other meters connected in multiple with the first meter, control valves for the last mentioned meters, and means actuated by the differential pressure between the supply and service mains acting automatically to fully open the control valves successively as the differential pressure exceeds certain successive maxima and to retain the valves fully open until the pressure falls below certain successive minima substantially less than the corresponding maxima, and to fully close the valves successively as the pressure falls below such minima and retain them fully closed until the pressure again exceeds the said maxima, the minimum pressure at which each valve closes being less than the pressure to which the gas will drop when such valve is opened, whereby fluttering of the valves is prevented; substantially as described.

In testimony whereof I have hereunto set my hand.

THOMAS B. WYLIE.

Witnesses:
    GEO. B. BLEMING,
    L. H. JOHNSON.